(12) United States Patent
Tabata

(10) Patent No.: US 7,585,021 B2
(45) Date of Patent: Sep. 8, 2009

(54) ARMREST WITH CUP-HOLDER

(75) Inventor: Tsuyoshi Tabata, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/927,042

(22) Filed: Oct. 29, 2007

(65) Prior Publication Data

US 2009/0108652 A1    Apr. 30, 2009

(51) Int. Cl.
    *A47C 7/62* (2006.01)
(52) U.S. Cl. .................................................. 297/188.14
(58) Field of Classification Search ............ 297/188.14, 297/DIG. 1, DIG. 2, 452.38; 248/311.2; 224/275
    See application file for complete search history.

(56) References Cited

U.S. PATENT DOCUMENTS 5,911,472 A * 6/1999 Toth ........................ 297/188.2
5,997,082 A * 12/1999 Vincent et al. ......... 297/188.19
7,334,838 B2 * 2/2008 Pope ...................... 297/188.14
2005/0051584 A1 * 3/2005 Shelmon et al. ............. 224/275

FOREIGN PATENT DOCUMENTS

JP            2000238568       5/2000

* cited by examiner

*Primary Examiner*—Milton Nelson, Jr.
(74) *Attorney, Agent, or Firm*—Browdy and Neimark, P.L.L.C.

(57) ABSTRACT

An armrest with cup holder of the type where the cup holder is integral with a foam padding in a trim cover assembly through a foaming process, wherein the cup holder is inserted in a hole formed in the trim cover assembly. A uniform stretcher protrusion is defined in a given local peripheral region of the cup holder about which the afore-said hole is engaged, so that a substantially circular edge of that hole is uniformly stretched by and along the uniform stretcher protrusion, thereby causing a close contact of such substantially circular edge of the hole on and about the uniform stretcher protrusion, so as to insure preventing leakage of a liquid foaming agent from between that particular hole and the cup holder during the foaming process.

4 Claims, 3 Drawing Sheets

ARMREST WITH CUP-HOLDER

BACKGROUND OF THE INVENTION

1. Field of the Invention

The present invention generally relates to an armrest of the type having a cup holder provided therein, which is to be used with an automotive seat. In particular, the invention is directed to an armrest of this kind, which is formed by a foaming process wherein a liquid foaming agent is injected into an inside of a preformed trim cover assembly that has been provided with a cup holder, and then, the agent is cured to form an increased mass of foam padding filled in that trim cover assembly in a manner integral with the cup holder.

2. Description of Prior Art

There has been known an armrest with a cup holder for use in an automotive seat, which allows one or more cups of drink, or one or more drink containers or bottles, to be directly placed on the armrest at that cup holder. In forming such armrest with cup holder, there is known the earlier mentioned integral foaming process wherein a trim cover assembly and a cup holder are to be formed integrally together in a foaming die, with a liquid foaming agent injected and cured in the trim cover assembly.

But, such foaming process has been with the problem that the liquid foaming agent may be leaked through a clearance between the peripheral end of the cup holder and the trim cover assembly. Hitherto, a typical solution to such leakage problem is disclosed from the Japanese Laid-Open Patent Publication No. 2000-238568, for example, According thereto, prior to the foaming process, a cup holder having a flange projecting radially therefrom is inserted in a given hole preformed in a three-dimensional trim cover assembly of armrest, with the flange thereof placed upon an outer surface of the trim cover assembly to surround the cup holder. Then, a ring frame element is securely attached to a reverse surface of the trim cover assembly at a whole region circumscribing that particular hole, while the cup holder passing therethrough, so that the circular end portion of the hole is firmly sandwiched between the cup holder flange and the ring frame element. Thus, during the subsequent foaming process, a liquid foaming agent injected in the trim cover assembly is prevented from being leaked through between the hole and cup holder flange.

However, in the foregoing prior art, the ring frame element is integrally fixed on an armrest frame provided in the trim cover assembly. Due to such construction, the armrest frame itself becomes complicated structurally and also increases its dimensions, as a consequence of which, another through-hole of the trim cover assembly, adapted for ingress of such armrest frame therethrough for installation within the trim cover assembly as known in the art, also has to be increased in size correspondingly. This may undesirably increase the possibility of the liquid foaming agent being leaked from such increased size of through-hole, and therefore, a special arrangement be required for preventing leakage of the liquid foaming agent through that through-hole, hence resulting in increase of costs involved. Further, more troublesome steps and labors will be needed to have the circular end of the afore-said cup holder hole sandwiched between the ring frame element and cup holder flange, which will also require a pressing means for aiding in such particular assembly steps.

SUMMARY OF THE INVENTION

In view of the above-stated drawbacks, it is a purpose of the present invention to provide an improved armrest with cup holder which insures to prevent leakage of a liquid foaming agent injected therein from between the cup holder and a trim cover assembly of the armrest.

In order to achieve such purpose, in accordance with the present invention, there is basically provided an armrest with cup holder, which is of a type-formed with the cup holder and a foam padding in an integral manner through a foaming process involving the steps of injecting a liquid foaming agent into inside of a three-dimensional trim cover assembly of a shape conforming to a predetermined contour of the armrest and then curing the liquid foaming agent to form the foam padding in the inside of the three-dimensional trim cover assembly, wherein the cup holder includes a given local peripheral surface region,
  wherein the three-dimensional trim cover assembly includes a hole formed therein, the hole having a substantially circular edge defined therealong;
  wherein a uniform stretcher protrusion is provided to the afore-said given local peripheral surface region of said cup holder, such uniform stretcher protrusion having an outer peripheral wall for causing the hole of the three-dimensional trim cover assembly to stretch uniformly;
  wherein the foregoing hole of three-dimensional trim cover assembly is smaller than the outer peripheral wall of said uniform stretcher protrusion,
  wherein the cup holder is inserted in that hole of three-dimensional trim cover assembly, with the substantially circular edge of the hole being uniformly stretched by and along the outer peripheral wall of said uniform stretcher protrusion, and
  wherein the foam padding is filled in the trim cover assembly together with the cup holder in an integral manner.

Accordingly, due to the afore-said uniformly stretched state, a corresponding resilient recovery force is created in an entirety of the afore-said substantially circular edge, which in turn causes that particular edge to closely contact on and about the outer peripheral wall of the uniform stretcher protrusion, thereby insuring to prevent leakage of the liquid foaming agent from between the hole during the foaming process.

As one aspect of the present invention, the cup holder may include at least one planar surface region, and the uniform stretcher protrusion may include at least one cambered protrudent region defined in the outer peripheral wall thereof at a point corresponding to the afore-said at least one planar surface region, so that substantially circular edge of the hole is retained in a uniformly stretched state by the uniform stretcher protrusion.

As another aspect of the invention, the cup holder may include a wavy curved surface region of substantially "W" shape in section, and the uniform stretcher protrusion includes a cambered protrudent region defined in the outer peripheral wall thereof at a point corresponding to the wavy curved surface region of substantially "W" shape, so that the substantially circular edge of said hole is retained in a uniformly stretched state by the uniform stretcher protrusion.

Another features and advantages of the present invention will become apparent from reading of the description hereinafter, with reference to the annexed drawings.

DETAILED DESCRIPTION OF PREFERRED EMBODIMENT OF THE INVENTION

Referring to FIGS. 1 to 6, there is illustrated an armrest with cup holder in accordance with the present invention. In this respect, the annexed drawings only give a sectional view of a local part of the armrest per se by the designation of (AR) in FIG. 6, but, it is to be understood that, based on the descriptions hereinafter and FIGS. 4 to 6, any person skilled in the art can easily understand a whole of the armrest (AR) with cup holder (B) in the present invention.

Figure 1:
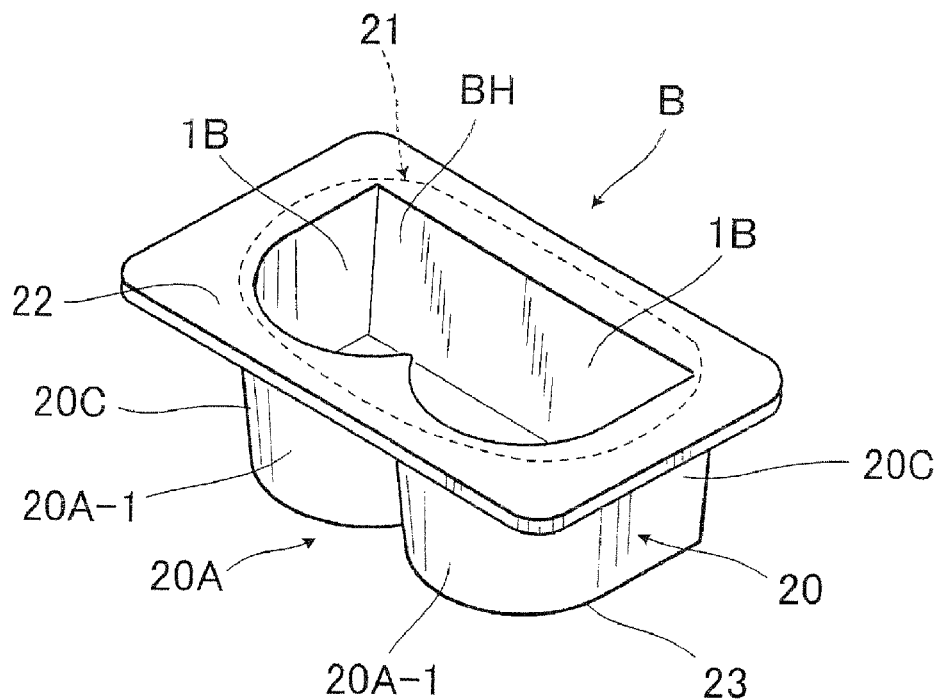
FIG. 1 is a schematic perspective view of a cup holder to be provided in an armrest with cup holder in accordance with the present invention.
Figure 2:
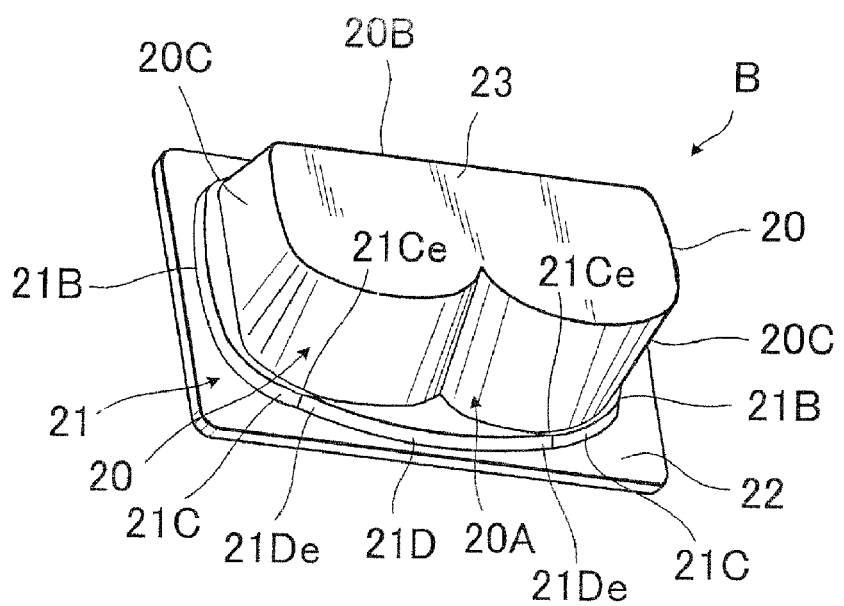
FIG. 2 is a schematic perspective view of the cup holder as viewed from the bottom side thereof.
Figure 3:
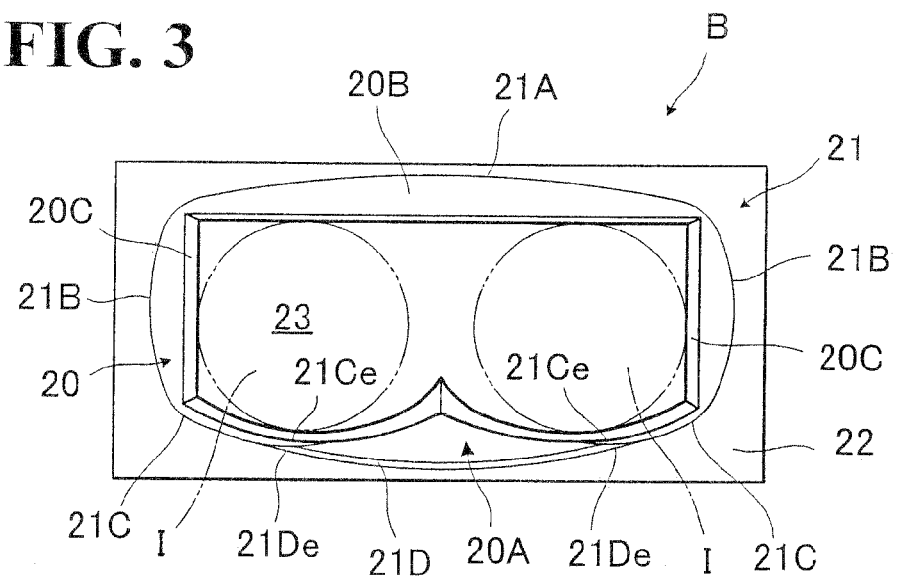
FIG. 3 is a bottom view of the cup holder.

FIG. 1 is a perspective view of the cup holder (B) which forms a principal constituent element of the armrest (AR) of the present invention. FIG. 2 is a perspective view showing that cup holder (B) from the bottom side thereof and FIG. 3 is a bottom view of the same. From those figures, it is seen that the shown mode of cup holder (B) is designed to supportively receive two cups or two containers therein, as indicated by (I) in the two-dot chain lines.

According to the illustrative embodiment, the cup holder (B) per se is basically so formed to have a flange portion (22) and a main body portion (20) defined beneath the flange portion (22). As shown, the main body portion (20) has, defined therein, a cup receiving space (1B) so configured as to receive and support a pair of cups (I) (I) for example, whereas the flange portion (22) extends continuously and outwardly from the upper end of that main body portion (20).

In this regard, specifically stated, the main body portion (20) is formed by: a wavy curved wall (20A) of substantially "W" configuration having a pair of cambered wall regions (20A-1) (20A-1) defined therein; a first vertical planar wall (20B) facing such wavy curved wall (20A); and a pair of opposedly facing second vertical planar walls (20C) (20C) that are defined between those wavy curved wall (20A) and first vertical planar wall (20B). Such formation of cup holder (B) is an optimum mode for stably and embracingly supporting two cups or containers (I) therein.

Figure 4:
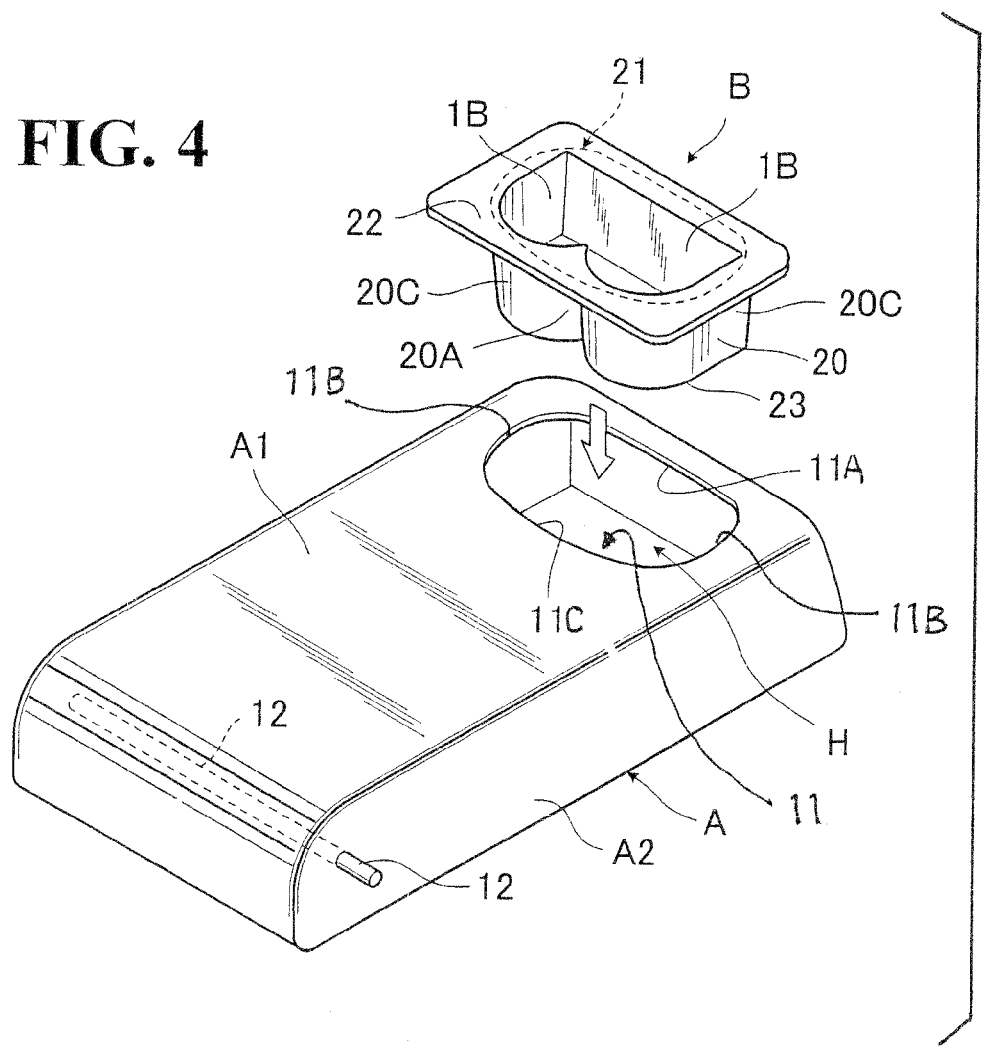
FIG. 4 is an exploded perspective view showing how the cup holder is to be inserted in a securing hole of a trim cover assembly.

As shown in FIG. 4, a three-dimensional trim cover assembly (A) is provided as one of constituent element forming the armrest (AR), which is preformed by sewing together a plurality of cover materials into the illustrated three-dimensional hollow configuration confirming to a predetermined contour of armrest body. As is known, the trim cover assembly (A) has a securing hole (H) formed in the upper wall portion (A1) thereof, the securing hole (H) being adapted for securely supporting the cup holder (B). Namely, the securing hole (H) is so configured as to allow frictional insertion of the aforesaid cup holder main body portion (20) therethrough into the inside of the trim cover assembly (A) and thus locate or retain the same (20) in position with respect to the trim cover assembly (A), And also, a shaft (12) extends transversely through the trim cover assembly (A) and terminates in two distal end portions that project outwardly from the respective two lateral walls (A2) of the trim cover assembly (A). Although not shown, such known shaft (12) is firmly connected with a given armrest frame within the trim cover assembly (A) and adapted for rotatable connection with an automotive seat, so that the armrest (AR) is rotatable vertically about the shaft (12) in a direction towards either of use and non-use positions. This is not the subject matter of the present invention, and any further description will not be made thereon.

In this context, generally stated, the aforementioned securing hole (H) formed in the trim cover assembly (A) is simply formed in a substantially circular or elliptical shape as illustrated, with a view to simply allowing the edge (11) thereof to elastically and closely contact the peripheral walls of main body portion (20) of cup holder (B). However, in the illustrated embodiment, the peripheral wall of the cup holder main body portion (20) is uneven or irregular in shape, as stated earlier, since it includes a flat vertical wall portions (at 20B and 20C), acutely angled corner portions among such flat vertical wall portions, and two pronouncedly cambered wall portions (at 20A-1), which are however of an optimum configuration to embracingly and supportively receive two cylindrical cups or containers (I) therein. Consequently, in fact, when such uneven contour of cup holder main body portion (20) is frictionally inserted through the elliptical securing hole (H), a plurality of non-contact points are defined between that main body portion (20) and the edge (11) of the securing hole (H), as a result of which, a whole of the securing hole (H) is not stretched uniformly and thus in no way generates uniform resilient recovery force towards the cup holder main body portion (20). Hence, the entire edge (11) of securing hole (H) is not in close contact about the irregular contour of cup holder main body portion (20), which undesirably creates a plurality of clearances therebetween and allows leakage of a liquid foaming agent (at CA in FIG. 5) therethrough.

With the foregoing defective points in view, in accordance with the present invention, the cup holder (B) is formed with a uniform stretcher protrusion (21) intended for giving a uniform outward force to a whole of the securing hole (H) when the main body portion (20) of the cup holder (B) is inserted through the securing hole (H), so that the entirety of edge (11) of that particular hole (H) is stretched uniformly by the uniform stretcher protrusion (21) in an outward direction, which in turn causes a resilient recovery or repercussive force in the entire corresponding localized region of trim cover assembly (A) that circumscribes the hole (H). Due to such resilient recovery force, an entirety of the securing hole edge (11) is resiliently contracted and biased to close contact on and about the cup holder main body portion (20). This arrangement insures to prevent leakage of the liquid foaming agent through between the securing hole (H) and the cup holder flange portion (22).

As far as the present embodiment is concerned, the uniform stretcher protrusion (21) is shown as being formed on the flange portion (22) of the cup holder (B) and having a generally elliptical shape substantially equal to or slightly smaller than the cross-sectional size (or diameter) of a predetermined area of the cup holder main body portion (20) about which the securing hole (H) is to be securely engaged. For that purpose, as illustrated, the uniform stretcher protrusion (21) may be formed by four continuous protrudent regions (21A, 21B, 21B and 21D) which act to insure realizing a uniformly stretched state of the securing hole (H), while providing a uniform inward contractive state of that particular hole (H) at the same time, to thereby cause a close contact between the entire circular edge (11) of that securing hole (H) and a corresponding entire circumferential surface region of the cup holder main body portion (20).

Generically stated, in the present embodiment, the aforesaid uniform stretcher protrusion (21) may preferably be formed to have the following four protrudent regions: a first curved protrudent region (21A) adapted to cause a first arcuate edge region (11A) of the securing hole (H) to be in a uniformly stretched state; a pair of second curved protrudent regions (21B) (21B) adapted to cause the respective pair of second arcuate edge regions (11B) (11B) of the hole (H) to be in a uniformly stretched state; and a third curved protrudent region (21D) adapted to cause a third arcuate edge region (11C) of the hole (H) to be in a uniformly stretched state. It is to be seen that those four curved protrudent regions (21A, 21B, 21B and 21D) are formed integral with one another to constitute one uniform stretcher protrusion (21) having a continuous circular or elliptical lateral surface that substantially conforms to the circular or elliptical edge (11) of the securing hole (H). Note that the securing hole (H) is smaller in diameter than the uniform stretcher protrusion (21).

Further, in accordance with the present invention, since the cup holder main body portion (20) includes the two pronouncedly cambered wall portions (20A-1) (20A-1) each being continuous with the respective two vertical planar wall portions (20C) (20C), the two second protrudent regions (21B) (21B) are each formed with an curved extension (21C) having a tapered curved end portion (21Ce) and also, as different from the first and second curved protrudent region (21A) (21B), the third curved protrudent region (21D) is only formed to assume an independent cambered plate wall, as best seen in FIG. 3. Namely, the third curved protrudent region (21D) is formed from a curved plate material and defined on the flange portion (22) in such a manner that the midway cambered area thereof is most distant from the recessed central area of the generally W-shaped wavy curved wall region (20A) and terminates in two tapered end portions (21De) (21De) which extend to a point adjacent to the wavy curved wall region (20A). As best understandable from FIG. 3, the two tapered end portions (21De) of the third curved protrudent region (21D) are respectively juxtaposed on and along the two tapered end portions (21Ce) respective of the afore-said two curved extensions (21C) in a close contact therewith. Such arrangement establishes a uniform cambered protrusion region in a manner continuous with both two curved extensions (21C), which arcuately surrounds the entire W-shaped wavy curved wall region (20A) and functions to give a uniform outward force to the entire third arcuate edge region (11C) of securing hole (H), in order that such particular third arcuate edge region (11C) itself may be repercussively contracted inwardly due to its resilient recovery force, for close contact with an entirety of the two curved extensions (21C) and third curved protrudent region (21D). This insures to prevent leakage of the liquid foaming agent (AC) through between the cup holder flange portion (22) and the third edge region (11C) of securing hole (11).

Figure 5:
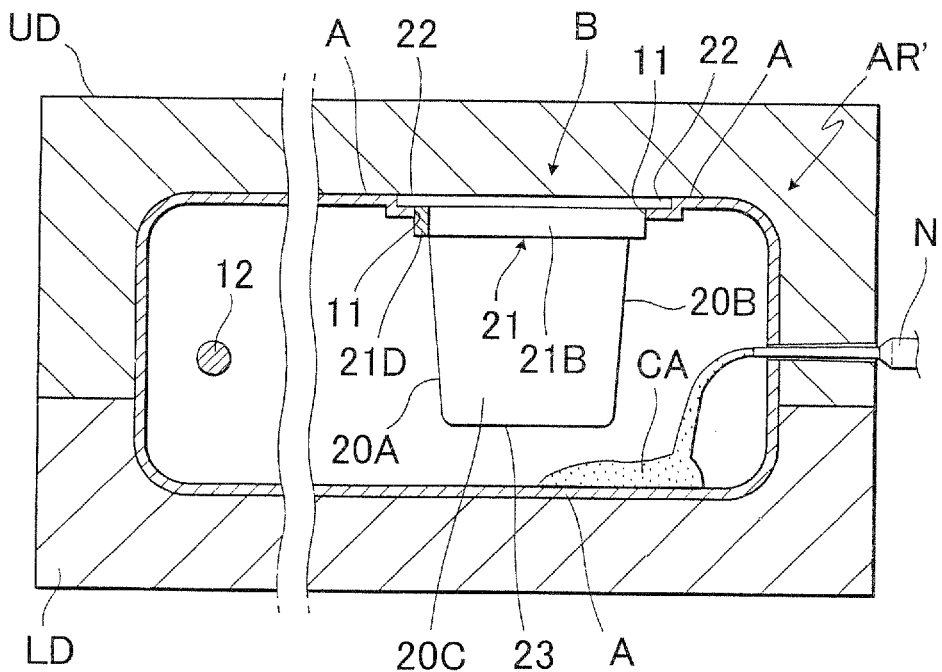
FIG. 5 is a sectional view for explanatorily showing a foaming process to form the armrest with cup holder.
Figure 6:
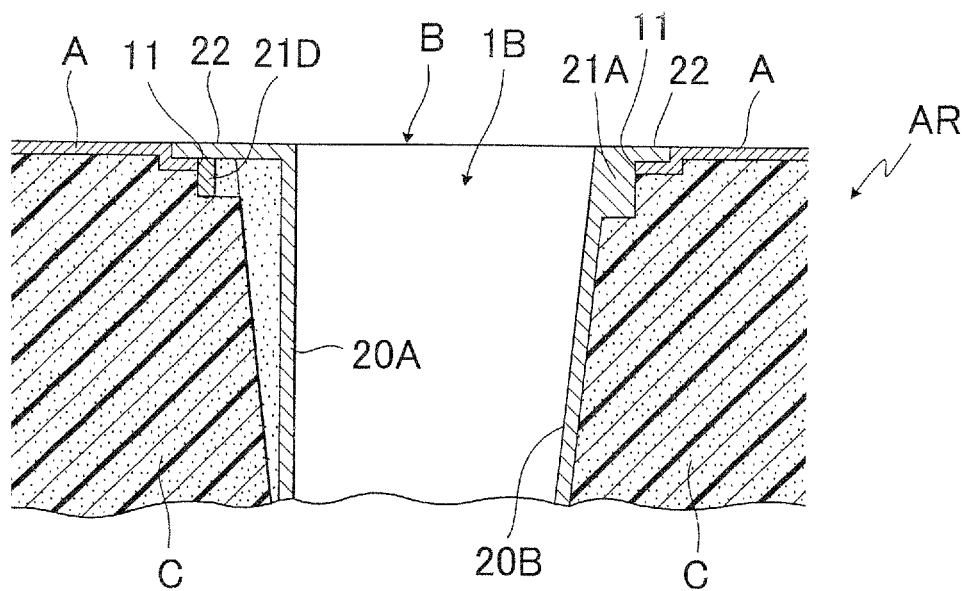
FIG. 6 is a partial sectional view showing a principal part of the armrest that has been integral with a foam padding after the foaming process.

Referring now to FIGS. 4 to 6, a description will be made of a foaming process for forming the armrest (AR) integral with the cup holder (B).

At first, the above-described cup holder (B) is inserted in the securing hole (H) of the trim cover assembly (A), as indicated by the arrow in FIG. 4, so that there is provided a basic armrest unit (AR') which comprises the hollow trim cover assembly (A), the cup holder (B) secured in the securing hole (H), with the flange portion (11) thereof overlaying a given localized area of the trim cover assembly (A) that circumscribes the hole (H), and other required frames (not shown), including the shaft (12), which are disposed within the trim cover assembly (A).

At this point, from the previous description and FIG. 5, it is seen that all the four arcuate edge regions (11A, 11B, and 11C) of the securing hole (H) are in close contact on and about the entire four curved protrudent regions (21A, 21B, 21B and 21D) which includes the two curved extensions (21C) (21C).

Then, as shown in FIG. 5, the foregoing basic armrest unit (AR') is placed in a known foaming die comprising upper and lower dies (UD) (LD), and thereafter, a liquid foaming agent (CA) is injected into the inside of the trim cover assembly (A) through an injection nozzle (N). During foaming operation, the liquid foaming agent (CA) is cured into an increased mass of foam padding (C) filled in the trim cover assembly (A), as well known in the art, whereupon an armrest with cup holder is produced, as indicated by the designation (AR) in FIG. 6, although a whole of the armrest (AR) is not shown.

As can be seen from the FIG. 6 as well as from the description above, the liquid foaming agent (CA) is completely prevented against leakage through between the holder cup flange portion (11) and the securing hole (H).

As described above, in accordance with the present invention, it is to be appreciated that the uniform stretcher protrusion (21) can be simply and easily formed on a predetermined area of the cup holder (B) about which the securing hole (H) is engaged, to assuredly prevent outward leakage of liquid foaming agent (CA) through that hole (H) during a foaming process. This also leads to the following advantages: (i) There is no need for providing any retainer element for firmly sandwiching the cup holder flange portion (22) and localized region of trim cover assembly (A) circumscribing the securing hole (H), as found in the prior art, (ii) Since such retainer element is not connected with an armrest frame usually provided in the armrest, the armrest frame itself remains simple in structure and thus does not require increase of its size, and (iii) In a process of forming the cup holder (B), the uniform stretcher protrusion (21) can be simultaneously formed on a given area of that cup holder (B) about which the securing hole (H) is to be engaged, and therefore, a precise and easy formation of both cup holder (B) and uniform stretcher protrusion (21) is realized.

While having described the present invention so far, it should be understood that the invention is not limited to the illustrated embodiment, but any other modification, replacement and addition may be applied thereto without departing from the scopes of the appended claims. For example, all the curved protrudent regions (21A, 21B, 21B and 21D) as well as the curved extension (21C) may be formed from a curved plate material and integrally formed on the flange portion (11).

What is claimed is:

1. An armrest with cup holder, which is of a type formed with the cup holder and a foam padding in an integral manner through a foaming process involving the steps of injecting a liquid foaming agent into an inside of a three-dimensional trim cover assembly of a shape conforming to a predetermined contour of the armrest and then curing the liquid foaming agent to form the foam padding in the inside of the three-dimensional trim cover assembly, wherein said cup holder includes a given local peripheral surface region, wherein said three-dimensional trim cover assembly includes a hole formed therein, said hole having a substantially circular edge defined therealong;

wherein a uniform stretcher protrusion is provided to said given local peripheral surface region of said cup holder, said uniform stretcher protrusion having an outer peripheral wall for causing said hole of said three-dimensional trim cover assembly to stretch uniformly;

wherein said hole of the three-dimensional trim cover assembly is smaller than said outer peripheral wall of said uniform stretcher protrusion, wherein said cup holder is inserted in said hole of said three-dimensional trim cover assembly, with said substantially circular edge of the hole being uniformly stretched by and along said outer peripheral wall of said uniform stretcher protrusion, and wherein said foam padding is filled in said trim cover assembly together with said cup holder in an integral manner.

2. The armrest with cup holder as claimed in claim 1, wherein said cup holder includes at least one planar surface region, and wherein said uniform stretcher protrusion includes at least one cambered protrudent region defined in the outer peripheral wall thereof at a point corresponding to said at least one planar surface region of said cup holder, so that said substantially circular edge of said hole is retained in a uniformly stretched state by said uniform stretcher protrusion.

3. The armrest with cup holder as claimed in claim 1, wherein said cup holder includes a wavy curved surface region of substantially "W" shape in section, and said uniform stretcher protrusion includes a cambered protrudent region defined in an outer peripheral wall thereof at a point corresponding to said wavy curved surface region of substantially "W" shape, so that said substantial circular edge of said hole is retained in a uniformly stretched state by said uniform stretcher protrusion.

4. The armrest with cup holder as claimed in claim 3, wherein said cambered protrudent region of said uniform stretcher protrusion is formed from a curved plate material.

* * * * *